United States Patent [19]
Wilson et al.

[11] 3,936,701
[45] Feb. 3, 1976

[54] TIMING CIRCUIT FOR ELECTRONIC UNDERVOLTAGE DETECTING DEVICE AND LATCH

[75] Inventors: John T. Wilson; Wardell Gary, both of Beaver, Pa.

[73] Assignee: Westinghouse Electric Corporation, Pittsburgh, Pa.

[22] Filed: Aug. 29, 1974

[21] Appl. No.: 501,561

[52] U.S. Cl.......... 317/31; 317/148.5 R; 317/33 SC; 317/154
[51] Int. Cl.² .......................................... H02H 3/24
[58] Field of Search .......... 317/148.5 R, 31, 33 SC, 317/52, 33 VR, 154

[56] References Cited
UNITED STATES PATENTS

| | | | |
|---|---|---|---|
| 3,551,746 | 12/1970 | Rubner | 317/31 |
| 3,577,040 | 5/1971 | Campbell, Jr. | 317/154 |
| 3,590,325 | 6/1971 | McMillen et al. | 317/31 |
| 3,590,334 | 6/1971 | Baker | 317/148.5 R |
| 3,663,958 | 3/1972 | Crane | 317/31 |
| 3,719,859 | 3/1973 | Frantz et al. | 317/31 |

*Primary Examiner*—J. D. Miller
*Assistant Examiner*—Patrick R. Salce
*Attorney, Agent, or Firm*—M. J. Moran

[57] ABSTRACT

A timing device utilizing a transistor and silicon controlled rectifier to provide a momentary relatively high voltage for the solenoid coil of a tripping device which is part of an undervoltage detecting and tripping circuit to thus energize the coil to allow closing of a circuit breaker which is controlled by the undervoltage device when low voltage which originally caused the circuit breaker to trip is no longer present on the line to be protected by the circuit breaker. The relatively high voltage changes to a normal value shortly thereafter.

5 Claims, 2 Drawing Figures

TIMING CIRCUIT FOR ELECTRONIC UNDERVOLTAGE DETECTING DEVICE AND LATCH

BACKGROUND OF THE INVENTION

1. Field of the Invention

This invention relates generally to undervoltage detecting and tripping devices and it relates specifically to devices of this type using solid state circuitry.

2. State of the Prior Art

U.S. Pat. No. 3,557,040 by Richard H. Campbell, Jr. issued on May 4, 1971 and entitled "Solenoid Control Circuit" teaches an electronic circuit for actuating a solenoid load from an AC power source and a two step sequence wherein a high DC voltage is initially applied to pull in the solenoid armature after which the lower voltage maintains the armature in a hold condition. While this circuit requires two separate AC voltage levels for operation, it would be advantageous if a circuit could be devised utilizing only one level of sensing and energizing voltage. U.S. Pat. No. 3,582,716 by Richard O. Tralma issued June 1, 1971 and entitled "Apparatus For Providing Time Delay Upon Total Deenergization" teaches a solid state apparatus for providing an output at the end of a predetermined delay interval commencing with the total deenergization of the apparatus. It would be advantageous if a device could be provided which would provide an output at the beginning of a predetermined delay interval commencing with the total energization of an apparatus. U.S. Pat. 3,512,048 by K. D. Wallentowitiz et al issued May 12, 1970 and entitled "Electronic Timer Circuit" teaches the energization of a load after a timing cycle has been completed as was mentioned previously here would be advantageous to provide a device which would teach energization of a load drawing a timing cycle. Finally, U.S. Pat. No. 3,343,036 issued Sept. 19, 1967 to S. L. Steen and entitled "Static Undervoltage Circuit" primarily teaches a circuit which is utilized to turn off after a time delay. As was mentioned previously, it would be advantageous to teach the turning on of a load with the energization of a load with time delay where the energy supplied to the load could be reduced after the appropriate time delay.

SUMMARY OF THE INVENTION

In accordance with the invention, an undervoltage protection device is taught comprising a circuit breaker means for opening portions of an electrical system when the system voltage is below a first predetermined value and for closing the electrical system when the system voltage is above a second predetermined value. There is provided a sensing means which may comprise a control transformer having the primary winding thereof connected to the electrical system and a secondary winding connected elsewhere as will be described hereinafter. The sensing means senses the value of the system voltage and provides an output signal which is related to that value. The output signal may be provided on the secondary of the control transformer. It is also connected to coil means. The coil means will cause the circuit breaker to open when the coil means is deenergized and will not allow the circuit breaker means to be reclosed for any appreciable time while the coil means is deenergized. But when the coil means is energized, a spring loaded plunger is prevented from opening the circuit breaker means. The circuit breaker means may comprise a circuit breaker having separable main contacts, and the coil means may comprise a solenoid coil.

BRIEF DESCRIPTION OF THE DRAWINGS

For a better understanding of the invention, reference may be had to the preferred embodiment the exemplary of the invention shown in the accompanying drawings in which.

DESCRIPTION OF THE PREFERRED EMBODIMENT

Figure 1:
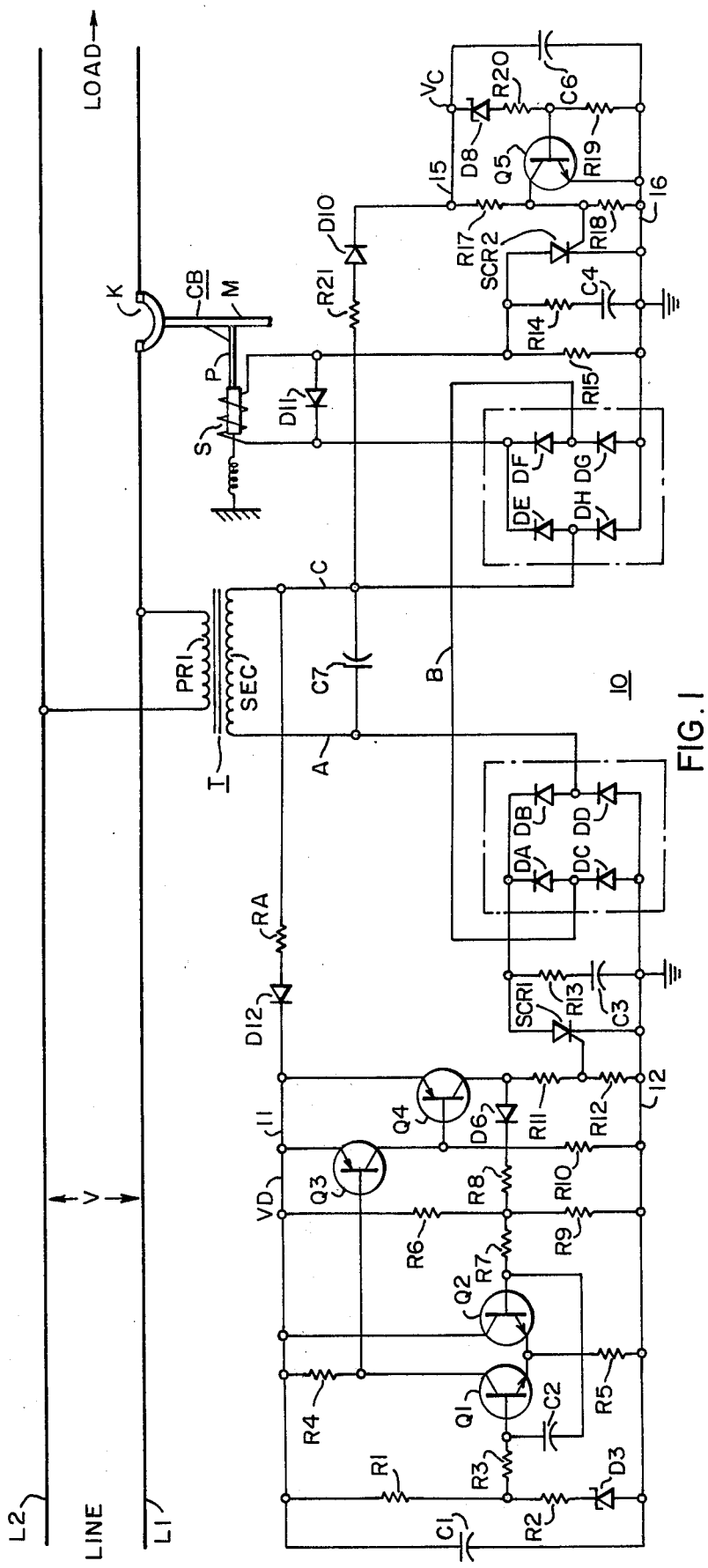
FIG. 1 shows a schematic diagram of an electronic undervoltage detecting device and latch.

Referring now to the drawings and FIG. 1 in particular there is shown an undervoltage protecting circuit or device 10 with pull-in means, latch means and timing circuit for the actuation of the pull-in means. There are shown two electrical power lines L1 and L2 which are to be protected by a circuit breaker CB having separable main contacts K. There may be disposed between the lines L1 and L2 the primary winding PRI of a transformer T which may be a control transformer, that is, a transformer capable of reducing 600 volts AC to 120 volts AC. There is also a secondary winding SEC for the transformer T. The circuit breaker has a mechanism portion M which is actuable by a solenoid plunger P which is driven or controlled by a solenoid S. The undervoltage trip circuit 10 detects when the voltage V between the lines L1 and L2 is of a predetermined low level and causes the solenoid coil S to actuate the plunger P to thus actuate the mechanism portion M to thereby cause the circuit breaker CB to open. In the preferred embodiment of the invention the undervoltage trip device 10 will actuate the solenoid trip coil S to cause the circuit breaker CB to open the main contacts K when the voltage between the lines L1 and L2 falls to approximately 65% of its rated value. Connected across the secondary winding SEC of the previously described transformer T is a capacitor C7 which is utilized for noise suppression. Connected to one side of the capacitor or capacitive element C7 is one terminal of a diode bridge DA through DD. The diode bridge DA-DD is connected at the output terminals thereof to a gating device SCR1. The gating device SCR1 has a voltage suppression series circuit combination of resistive element R13 and capacitive element C3 connected thereacross. Connected to the remaining terminal of the bridge DA–DD is a line or conductor B which leads to one input terminal of another bridge DE through DH. Connected to the other input terminal of the bridge DE–DH is the other side of the capacitive element C7 which is also the other side of the previously described secondary winding SEC of the transformer T. Connected to one output terminal of the bridge DE–DH is one side of the previously described shunt coil S the other side of which is connected to one side of a resistive element R15 which is normally used to drop a portion of the line voltage V which is available for the trip coil S to thus prevent burnout of the trip coil S because of excessive overvoltage. Connected in parallel circuit relationship with the resistive element R15 is a silicon controlled rectifier or similar gated device SCR2. Connected in parallel with the anode-to-cathode circuit of silicon controlled rectifier SCR2 is the series circuit combination of a resistive means R14 and a capacitive means C4 which combination is provided for noise suppressions for the previously described silicon controlled rectifier SCR2. Connected to the last mentioned side of the capacitive element C7 is one side of a resistive element R21. The other side of the resistive element R21 is connected to the anode of a diode D10 the cathode of which is connected to one side of a resistive element R17. Connected to the other side of the resistive element R17 is the gate of the silicon controlled rectifier SCR2 and one side of a resistive element R18 the other side of which is connected to the return line 16 for the diode bridge network DE–DH. Resistive elements R18 and R17 comprise a voltage divider network. Connected across the resistive means or element R18 is the collector-to-emitter circuit of a transistor Q5 with the emitter thereof being connected to the previously described system common 16 and the collector thereof being connected to the gate of the previously described silicon controlled rectifier SCR2. Connected across the resistive element R17 and R18 is the series circuit combination of a Zener diode D8 and a voltage divider comprising a resistive element R20 and a resistive element R19. One side of the resistive element R20 is connected to the anode of the previously described Zener diode D8. The regulating terminal of the Zener diode D8 is connected to the junction between the previously described resistive element R17 and the cathode of the previously described diode element D10. The other side of the resistive element R19 is connected to system common line 16. The base of the transistor Q5 is connected between the two resistive elements R19 and R20. Connected across the series circuit combination of the resistive elements R17 and R18 is a capacitive element C6 which is an electrical charge storage element.

The undervoltage detecting portion of the circuit 10 is shown on the left side of FIG. 1. There is a voltage dropping resistor RA, one side of which is connected to the same side of the secondary winding SEC of the transformer T as the resistive elemnt R21. Connected to the other side of the resistive element RA is the anode of a diode D12, the cathode of which is connected to a capacitive element C1. The other side of capacitive element C1 is connected to the system common 12 of the bridge network DA–DD. Said in another way, the other side of the capacitive element C1 is connected to the cathode of the silicon controlled rectifier SCR1. The capacitive element C1 comprises a storage capacitive element for the undervoltage detecting circuit 10. There is connected across the capacitive element C1 one end of a resistive means R1, the other end of which is connected to one end each of a resistive element R3 and to one end of a resistive element R2. The other end of resistive element R2 is connected to the regulating terminal of a Zener diode D3, the anode of which is connected to the previously described system common line 12. The other side of the resistive element R3 is connected to the base of an NPN transistor Q1, the collector of which is connected to one side of resistive element R4, the other side of which is connected to line 11 which is also connected to the other side of resistive element R1 which in turn is the high side of the capacitive element C1. Also connected to the collector of the transistor Q1 is the base of another transistor Q3, the emitter of which is connected to the previously described line 11. Also connected to line 11 is one side of a resistive element R6, the other end of which is connected to one side of a resistive element R9. The remaining end of the resistive element R9 is connected to the system common line 12. Connected to the junction between the resistive elements R6 and R9 are one end each of two other resistive elements R7 and R8. The other end of resistive element R7 is connected to the base of the transistor Q2, the collector of which is connected to line 11, and the emitter of which is connected to the emitter of the previously described transistor Q1. Both transistors Q1 and Q2 in this embodiment of the invention are NPN transistors. The common junction of the emitters of the transistors Q1 and Q2 is connected to one end of a single resistive element R5, the other end of which is connected to line 12. The other end of the previously described resistive element R8 is connected to the cathode of diode D6 the other end of which is connected to one end of a resistive element R11 and to the collector of a transistor Q4. The base of transistor Q4 is connected to the collector of the previously described transistor Q3 and to one side of a resistor element R10, the other side of which is connected to line 12. The emitter of transistor Q4 is connected to the power supply line 11. The other side of the resistive element R11 is connected to the previously described gate of the silicon controlled rectifier SCR1 and to one side of a resistive element R12. The other side of resistive element R12 is connected to system common 12.

OPERATION

When sufficient predetermined voltage V is present between the lines L1 and L2, the silicon controlled rectifier SCR2 is in the off state. Consequently, for a positive half cycle of voltage V, current flows from one side of the secondary SEC of the transformer T along line A through diode DB to the conducting silicon controlled rectifier SCR1 through the diode DC, through the line B, through the diode DF and trip coil S, providing sufficient maintaining energy for the coil S to keep the plunger P away from the mechanism M, so as not to trip it. The current then continues through the resistive element R15 so that there is a voltage dividing network including the trip coil S and the resistive element R15. The current then continues through the diode DH into line C and back to the other side of the secondary winding SEC of the transformer T. For a negative half cycle of voltage V, the current flows down line C through the diode DE through the trip coil S and resistive element R15 through the diode DG, through line B to the diode DA, through the conducting silicon controlled rectifier SCR1 back to the diode DD and out line A to the other side of the secondary winding SEC of the transformer T. In the preferred embodiment of the invention approximately 48 volts is dropped across the trip coil S during normal operating conditions as described above.

During normal operating conditions as described above the undervoltage control circuit 10 operate as follows. The voltage VD which exists across capacitive element C1, is of a sufficiently high magnitude to maintain the transistor Q1 on and the transistor Q2 off. This is because the voltage at the common junction of resistive elements R6, R7, R8, and R9 is less than the voltage at the top of the resistive element R5. Also, the voltage at the base of the transistor Q1 is greater by at least one diode drop than the voltage at the top of the resistive element R5. This is because the voltage at the common junction of the resistive elements R1, R2 and R3 is maintained generally higher than the previously described voltage between the resistive elements R6, R7, R8 and R9. This latter phenomenon is because of the presence of the nonlinear element or Zener diode D3 in the branch voltage divider which also comprises resistive elements R1 and R2. The transistor Q1 is on and the current flowing through resistive element R4 is sufficient to forward bias the base-to-emitter junction of the transistor Q3, thus keeping it on which in turn allows sufficient current to flow through resistive element R10 to keep the transister Q4 on. Since the transistor Q4 is on, sufficient current flows through the voltage divider comprising the resistors R11 and R12 to provide gate drive current and gate voltage to the gate of the silicon controlled rectifier SCR1 there are sufficient to keep the silicon controlled rectifier SCR1 in the on state, concurrently during normal operating conditions capacitive element C6, which had been charged through the resistive element R21 and diode D10 provides a steady stage voltage VC between lines 15 and 16. This voltage VC is sufficiently high to break down the Zener diode D8 causing a voltage to exist at the common terminal of the resistive elements R20 and R19 to maintain the transistor Q5 on the on state. If the transistor Q5 is in the on state, the resistive element R18 is shorted and there is insufficient voltage and gate current to keep the silicon controlled rectifier SCR2 in the on state, consequently device SCR2 is off causing the only current path for the return of current through the trip coil S to be through the resistive element R15.

Presuming the voltage V dropped across the line L1 and L2 attains a low value. Such being the case, the capacitive element C1 will proportionately discharge to a low voltage. The non-linear switching element or Zener diode D3 is sensitive to voltage. Eventually a voltage drop VD between the lines 11 and 12 is reached where the Zener diode element D3 ceases to conduct. Such being the case the voltage drop at the junction between the elements R1, R2 and R3 eventually reaches a point relative to the voltage drop between the resistor elements R6, R7, R8 and R9 to cause the transistor Q1 to turn off. When the transistor Q1 turns off the current flowing through resistive element R5 drops to a significantly lower level than was previously the case thus causing transistor Q2 to turn on to maintain the voltage drop across the resistive element R5 at a lower value than was the case previously and to complete the turn off of transistor Q1. When the transistor element Q1 turns off, the current flowing through the resistive element R4 drops to approximately zero, thus reverse biasing the base to emitter junction of the transistor element Q3, thus turning that transistor off. This reduces the current in the resistive element R10, causing the base-to-emitter circuit of the transistor element Q4 to be reversed bias, thus causing transistor Q4 to turn off. When the transistor element Q4 turns off, the current flowing through the resistive elements R11 and R12 drops to approximately zero, thus providing insufficient gate voltage and gate drive current to the silicon controlled rectifier SCR1. This causes the silicon controlled rectifier SCR1 to turn off. If the silicon controlled rectifier SCR1 turns off, the complete current path through the diode bridge DA–DD is opened thus interrupting current to the trip coil S. When the current through the trip coil S drops to zero, the spring loaded plunger P moves to the right against the mechanism M, thus causing that mechanism, M to trip the circuit breaker CB causing the separable main contacts K to open to act to protect the lines L1 and L2. When this happens the voltage on the line C drops to zero causing the capacitive element C6 to discharge. When the capacitive element C6 discharges the voltage provided by the voltage dividers R19 and R20 at the base of the transistor Q5 drops to a value insufficient to maintain transistor Q5 in the on state, and transistor Q5 turns off.

It is desirous to provide a hysteresis effect for the differential amplifier comprising the transistors Q1 and Q2. Diode element D6 in conjunction with resistive element R6 provides a sufficient hysteresis effect for the latter differential amplififer.

Figure 2:
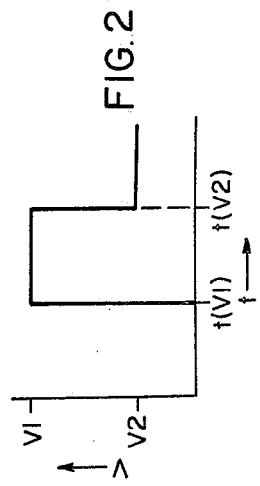
FIG. 2 shows a voltage versus time profile for the solenoid of FIG. 1.

As the voltage V across the lines L1 and L2 gets larger, it is desirous to close the circuit breaker CB to cause the separable main contact K to close so that power may be transmitted through the electrical system comprising the lines L1 and L2. In order to accomplish this, the capacitive element C1 charges through the half-wave rectifier diode D12 and dropping resistive element RA, as the voltage V between the lines L1 and L2 increase. The effective resistance represented by the combination of the resistive elements R1, R2 and the Zener diode D3, which at this time is in a non-regulating state; and the effective resistance represented by the resistive elements R6 and R9, cause the voltages at the bases of the transistors Q1 and Q2 to increase at different rates. Before Zener D3 breaks down, the voltage at the base of the transistor Q1 does not increase as quickly as the voltage at the base of the transistive Q2 and consequently, the status of the circuit 10 remains unchanged. However, when the Zener diode D3 breaks down and begins to conduct at a regulated voltage, the effective resistance of the combination of the resistive elements R1, R2 and the conducting Zener diode D3, changes causing the base voltage on the transistor Q1 to eventually become larger than the voltage at the emitter of the transistor Q2. When this happens the transistor element Q1 turns on causing even more current to flow through the resistive element R5 and causing the transistor elements Q3 and Q4 to turn on. At this point the base-to-emitter junction of the transistor Q2 becomes reversed biased because the voltage at the top of the resistive element R5 is significantly greater than the voltage at the base of the transistor Q2. Transistor Q2 then turns off. The current flowing through the resistive elements R11 and R12 once again provides sufficient voltage and current drive to the gate of the silicon controlled rectifier SCR1 to cause it to conduct. This causes current to flow through the previously described bridges DA–DD and DE–DH but current does not flow immediately through the resistive elements R15. Rather the fact that the voltage drop V across lines L1 and L2 has increased, causes a voltage to be provided across the voltage divider R17 and R18, thus causing sufficient voltage and current drive to be present on the gate of the silicon controlled rectifier SCR2 to cause it to conduct. Consequently, the resistive element R15 is shorted by the silicon controlled rectifier SCR2 thus providing nearly all of the secondary winding voltage of the transformer T across the trip coil S, thus energizing the trip coil S causing the plunger P to be pulled back, allowing the circuit breaker CB to be closed without causing a subsequent immediate reopening thereof because of an inadequately set plunger P. Of course this much voltage across and current through the relatively small trip coil S would eventually cause it to burn out. However, the voltage drop supplied across the resistive elements R17 and R18 causes the capacitive element C6 to charge with a certain time delay. Once the capacitive element C6 has been completely charged, the Zener diode D8 breaks down, causing a voltage to be applied by way of the voltage divider including resistive elements R20 and R19 to the base of the transistor Q5 thus shorting out the resistive element R18 and turning off the silicon controlled rectifier SCR2. Consequently, the current flowing through the coil S is shunted through the resistive element R15 providing a voltage divider between the resistance of the shunt coil S and resistance element R15. This significantly reduces the voltage across the shunt trip coil S but nevertheless maintains a voltage thereacross which is sufficient to maintain the plunger in the loaded state preparatory to to another operation cycle. The preceding voltage application sequence for the coil S is shown in FIG. 2.

It is to be understood with respect to the various embodiments of this invention that the use of either PNP or NPN transistors is not limiting and it is also to be understood that under certain operating conditions the transformer T need not be utilized provided the voltage of the lines L1 and L2 is compatable with the requirements of the circuit 10. This being the case the lines A and C may be directly connected to the lines L1 and L2. It is also to be understood that the various voltage and current values described herein are not limiting but are merely illustrative of a preferred embodiment.

The apparatus taught herein has many advantages. One advantage lies in the fact that the plunger P may be retracted after the voltage across the lines L1 and L2 has reached a sufficient predetermined value so that the circuit breaker CB may be closed without a subsequent immediate tripping thereof because of the disposition of plunger P. Another advantage lies in the fact that sufficient current may be provided to the trip coil to rapidly reload the plunger P against its loading spring. However, this voltage may be reduced after the plunger P has been loaded to a value sufficient to maintain the plunger P in its disposition without providing a quantity of current and/or voltage which would burn out the trip coil S.

What we claim as our invention is:

1. An undervoltage protection device, comprising:

a. circuit breaker means for opening an electrical system when the system voltage is below a first predetermined value and for closing said electrical system when said system voltage is above a second predetermined value;
   b. sensing means for sensing said system voltage;
   c. alternating current coil means energizable at a predetermined alternating coil voltage for preventing said circuit breaker means from closing upon said electrical system, said coil means controlling a spring loaded plunger means, said coil means when energized with said predetermined coil voltage keeping said spring loaded plunger means from causing said circuit breaker means to close upon said electrical system;
   d. control means interconnected with said sensing means and said coil means, said control means deenergizing said coil means when said system voltage is below said first predetermined value but applying a coil voltage significantly larger than said predetermined coil voltage to said coil means for a predetermined period of time to positively load said plunger means against its spring to allow said circuit breaker means to be closed by independent means when said system voltage is above said second predetermined value, said control means thereafter maintaining said coil means at said predetermined coil voltage.

2. The combination as claimed in claim 1 wherein said control means comprise solid state circuit elements.

3. The combination as claimed in claim 1 wherein said sensing means comprises a control transformer having the primary winding thereof connected to a portion of said electrical system and the secondary winding thereof connected to said control means.

4. The combination as claimed in claim 1 wherein said circuit breaker means comprises a circuit breaker having separable main contacts, said circuit breaker being tripped when said coil means is deenergized, said circuit breaker having a mechanism therein for preventing the closing of said separable main contacts for any significant period of time when said coil means is in a deenergized state.

5. The combination as claimed in claim 1 wherein said coil means comprises a solenoid coil.

* * * * *